United States Patent [19]

Boncey et al.

[11] 3,887,700

[45] June 3, 1975

[54] ANALGESIC FORMULATIONS

[75] Inventors: Graham Arthur Boncey, Cowley; Maurice John Hedge, Windsor; James Rae Henderson, High Wycombe, all of England

[73] Assignee: Aspro Nicholas Ltd., Stough, England

[22] Filed: Nov. 12, 1973

[21] Appl. No.: 415,247

Related U.S. Application Data

[62] Division of Ser. No. 92,284, Nov. 23, 1970.

[30] Foreign Application Priority Data

Nov. 28, 1969 United Kingdom............... 58203/69

[52] U.S. Cl.................................. 424/44; 424/230
[51] Int. Cl............................................. A61k 11/02
[58] Field of Search............................. 424/44, 230

[56] References Cited
UNITED STATES PATENTS

| | | | |
|---|---|---|---|
| 2,211,485 | 8/1940 | Zimmermann.................. | 424/230 X |
| 3,136,692 | 6/1964 | Bandglin.............................. | 424/44 |
| 3,495,001 | 2/1970 | Leonards............................. | 424/44 |
| 3,653,914 | 4/1972 | Schmitt............................ | 424/44 X |
| 3,773,922 | 11/1973 | Gergozey............................. | 424/44 |

*Primary Examiner*—Shep K. Rose
*Attorney, Agent, or Firm*—William Anthony Drucker

[57] ABSTRACT

Free-flowing readily wettable aspirin particles comprise a core of aspirin substantially encompassed by a layer comprising a water-soluble pharmaceutically acceptable coating material having a melting point of at least 105°C, said coating material including at least one coating agent selected from low molecular weight amino acids, sugars, sugar alcohols and mixtures thereof, and a process for preparation of such particles comprises the steps of preparing a suspension of aspirin in an aqueous solution containing the coating material, and spray-drying said suspension, the ingredients in the suspension being made present in such relative amounts that the spray-drying step results in the formation of the particles having the characteristics set forth.

5 Claims, No Drawings

ANALGESIC FORMULATIONS

This is a division of application Ser. No. 092,284 filed Nov. 23, 1970.

This invention relates to aspirin compositions and in particular to aspirin compositions which are readily and completely soluble in water.

Aspirin preparations intended for dissolution in water have hitherto been presented in two distinct forms, i.e., the so-called "soluble" and "effervescent" forms. Basically these two forms both rely on solubilising the aspirin by forming a water-soluble salt thereof when the preparation is dispersed in water. The two forms differ however in the method by which dispersion in water is accomplished.

The soluble form normally comprises aspirin, calcium carbonate, citric acid and a disintegrating agent such as starch. On addition to water, the calcium carbonate and citric acid react to form calcium citrate which then reacts with the aspirin to form soluble calcium aspirin. The amounts of calcium carbonate and citric acid are only sufficient to convert the aspirin to calcium aspirin and only a small amount of effervescence takes place which is not sufficient to quickly disintegrate the tablet. This is accomplished by the disintegrating agent which, not being water-soluble, results in a cloudy dispersion being formed. Such soluble tablets are usually not much larger than conventional non-soluble aspirin tablets and weigh about 600 mg.

The effervescent form normally comprises aspirin, sodium bicarbonate and citric acid, and although it contains only the same amount of aspirin as the soluble form, the weight of the tablet is usually around 3 g. This much increased weight is almost entirely due to the presence of a quantity of sodium bicarbonate and citric acid sufficient to cause vigorous effervescence on addition to water so as to disintegrate the tablet and convert the aspirin to its soluble sodium salt form. Effervescent tablets form a completely clear solution which is heavily carbonated and contains a high concentration of sodium ions.

It is an object of the present invention to provide an aspirin composition which will readily disperse in water to form a clear solution which will be carbonated and hence more palatable than conventional soluble aspirin tablets. A further object is to provide an aspirin composition which will form such a clear solution without the need to use a large quantity of effervescent couple as in conventional effervescent tablets, which clear solution will therefore have a reduced sodium content with the attendant advantage of having less restriction on daily dosage limits. Another object of the present invention is to provide a soluble aspirin composition which may be formed into smaller tablets than conventional effervescent tablets or may contain a much increased therapeutic dosage in a tablet weight no greater than such conventional effervescent tablets. In accordance with another object of the invention, there is provided a free flowing, readily wettable aspirin composition which is suitable for use in water-dispersible aspirin formulations whether or not combined with an effervescent couple.

According to the present invention, therefore, there are provided free-flowing, readily wettable aspirin particles comprising a core of aspirin substantially encompassed by a layer comprising a water-soluble pharmaceutically acceptable coating material having a melting point of at least 105°C, said coating material being composed of or including one or more agents selected from low molecular weight amino acids, sugars, sugar alcohols and mixtures thereof. Preferred coating agents to compose or be included in said coating material include the sugar alcohols, mannitol, inositol and sorbitol, the amino acids glycine and methionine, the sugars sucrose and lactose as well as polymeric sugar products such as the arabino-galactan polymer sold under the trade name Stractan, and mixtures of such coating agents. The coating material advantageously has a melting point above 150°C. Preferred coating agents are mannitol, inositol and glycine.

The ratio by weight of aspirin to coating material in the particles of this invention may be as high as 9:1 but preferred ratios of aspirin to coating material are from about 7:1 to 1:1. Ratios as low as 1:10 may however be used, for example in preparing dispersible aspirin particles for administration to children, but it will readily be appreciated that such low ratios of aspirin to inactive coating material are necessarily less economical than is the case with ratios falling within the preferred range. To ensure good dispersibility of the aspirin particles of the present invention, the size of the particles should be such that at least 95% by weight should be 150 microns or less, and most advantageously 105 microns or less.

In addition to the foregoing components, the aspirin particles of the invention preferably contain a pharmaceutically acceptable wetting agent and/or a water-soluble film forming agent which assist in the formation of said particles and improve the dispersibility thereof in water.

Wetting agents, which may be present in amounts up to about 5% by weight, but preferably below 1% by weight, of the total weight of the particle, may be of the cationic, anionic or nonionic type. Exemplary of the cationic type are quaternary ammonium halides such as benzalkonium chloride, exemplary of the nonionic type are polyoxyethylene- and polyoxyethylene sorbitan- monooleates, monolaurates and monopalmitates, and exemplary of the anionic type are the alkyl and alkyl aryl sulphates, sulphonates and sulphosuccinates such as sodium dioctyl sulphosuccinate, sodium lauryl sulphate and dodecylbenzene sulphonate.

Film forming agents, which may be present in amounts up to about 10% by weight, but preferably below 1% by weight, of the total weight of the particle, include cellulose derivatives such as hydroxyethyl- cellulose, hydroxypropylmethyl cellulose and sodium carboxymethylcellulose, and natural and synthetic gums such as soluble starches, dextrin, dextran, gum acacia, gum tragacanth and polyvinylpyrrolidone.

According to a feature of the present invention, there is provided a process for preparing free-flowing particles of the type described above which includes the steps of preparing a suspension of aspirin in an aqueous solution containing the coating material, and optionally the wetting and/or film forming agents, and spray-drying the suspension, the ingredients in the suspension being made present in such relative amounts that the spray-drying step results in the formation of particles comprising a core of aspirin substantially encompassed by a layer of the coating material. In accordance with a preferred method of carrying out the process of this invention, the aspirin is suspended in an aqueous solution of the wetting agent and the resultant suspension is converted to a smooth paste by addition of a first portion of a quantity of an aqueous solution of the coating material and the film forming agent, the remainder of said quantity of solution being added to said paste to form the suspension, said suspension being fed with continuous agitation to a spray-drying means. The amount of water used in the preparation of the aspirin suspension is not critical but it must be sufficient to allow the suspension to be fed to the spray-drier. Since all the water must be removed in the spray-drier, it will be clear that an unnecessarily large amount of water should also be avoided. Generally therefore, it has been found that the process of the present invention can be most satisfactorily operated when the weight of water used in preparation of the suspension of aspirin is from about 1 to 5 times the weight of the total solid content of the suspension.

The spray drier may be of conventional type equipped with a suitable centrifugal atomiser or jet capable of ejecting droplets of the suspension into a current of hot gas, normally air. The inlet temperature of the spray-drier may range from about 125° to 300°C, and is preferably from about 150° to 300°C, depending on the coating agent present in the suspension, whilst the outlet temperature will normally be from about 50° to 180°C. In order to obtain the most useful suspension for spray-drying, it is preferred that the aspirin for use in that suspension should have a particle size of from 10 to 300 microns and most advantageously 70% by weight of the aspirin should have a particle size less than 75 microns.

The free-flowing, readily wettable powder obtained by the foregoing process may be used in the preparation of water-dispersible or soluble aspirin powders or tablets. It is however particularly suited to be combined with an effervescent couple to form an effervescent powder or tablet. Using the aspirin particles of the present invention, such effervescent preparations will normally contain half or less than half the quantity of effervescent couple used in conventional effervescent aspirin tablets or can contain double or more than double the weight of active ingredient without weighing more than conventional effervescent aspirin tablets. Accordingly, a feature of the present invention is the provision of effervescent compositions, preferably tablets, comprising the free-flowing readily wettable aspirin particles of the present invention and an effervescent couple, the ratio by weight of the aspirin to the total weight of the composition being greater than 1:8 and preferably between 1:6 and 1:3. Since in conventional effervescent aspirin tablets that ratio is 1:10 or even less, it can readily be appreciated that considerable cost savings may be made using the coated aspirin particles of the present invention, not only in terms of the savings attributable to reduced quantities of effervescent couple but also in packaging costs due to the much smaller tablet size resulting from using these coated particles. As an example a conventional effervescent aspirin tablet containing 300 mg. of aspirin will normally weigh from about 3 to 3.6 g. whilst an effervescent aspirin tablet of the present invention containing coated aspirin particles equivalent to 300 mg. of aspirin can weigh as little as about 1.1 to 1.3 g. A further advantage of the use of the coated particles of the present invention in effervescent compositions is that the coating prevents interaction of the aspirin and the alkali component of the couple prior to dispersion in water. Such effervescent compositions are therefore more stable than conventional effervescent compositions.

The effervescent couple comprises a mixture of a pharmacologically acceptable acid and alkali which on contact with water will react to liberate carbon dioxide causing effervesence and hence dissolution of the composition throughout the water and carbonation of the resultant solution. Suitable acids, which may be used singly or in combination, include particularly citric acid, fumaric acid, adipic acid, malic acid and tartaric acid as well as mono-alkali metal salts thereof. Suitable alkalis include particularly ammonium, alkali metal and alkaline earth metal carbonates and bicarbonates and mixtures thereof, particularly sodium and potassium carbonate or bicarbonate.

In accordance with another feature of the present invention, all or a part of the particles of an acidic component of the effervescent couple has its properties modified by the formation on the surface thereof of a water-soluble coating such that the coated acid particles are substantially stable in the presence of an alkali component of the effervescent couple until the composition is dispersed into water whereupon the coating is dissolved leaving the acid free to react with the alkali component. Suitable coatings include water-soluble materials such as pharmaceutically acceptable natural or synthetic gums, sugar or sugar alcohols, for example polyvinylpyrrolidone, sucrose, lactose or mannitol, as well as coatings comprising an alkali or alkaline earth metal salt of the acid. Coatings with a pharmacologically acceptable water-soluble material may be achieved by conventional means. The salt coating may be formed by reacting the acid in a semi-dried state with a suitable alkali or alkaline earth metal salt, the acid being reacted with a less than stoichiometric proportion of the salt, and thereafter drying the resultant product. Alternatively the coating may be formed by mixing the acid in a semi-dissolved state with a salt composition in water obtained by reacting the acid with a less than stoichiometric proportion of a suitable alkali or alkaline earth metal salt and thereafter drying the resultant product. All or a part of the alkali component of the effervescent couple may be similarly treated. As mentioned previously, the coated aspirin particles of the present invention may be used in the preparation of pharmaceutical compositions, particularly those intended to be dispersed in water. Such compositions will normally comprise the free-flowing readily wettable aspirin particles and a pharmaceutically acceptable carrier therefor. The carrier may serve as a vehicle or diluent therefor and may be solid, semi-solid or liquid. Exemplary of carriers acting as vehicles for the aspirin particles are sachets and capsules. Examplary of diluents are starch, lactose, mannitol, sorbitol, sucrose, syrup B.P., gum acacia, gum tragacanth, stearates, talc, methyl and propyl p-hydroxybenzoates and sweeteners. The effervescent couples referred to above are also included within the term diluents. In effervescent compositions, only water-soluble diluents will normally be used and commonly in such compositions the only diluents will be an effervescent couple and a sweetener, particularly one or a mixture of saccharin, cyclamic acid, or an alkali metal salt thereof.

The following Examples will further illustrate the present invention:

EXAMPLE 1

Free flowing coated aspirin particles were prepared as follows:

| | |
|---|---|
| Mannitol | 1000 g. |
| Aspirin | 3000 g. |
| Polyvinylpyrrolidone | 6.5 g. |
| Sodium di(2-ethylhexyl)sulphosuccinate | 0.5 g. |
| Distilled water | q.s. |

The mannitol was dissolved in water (6 litres). The polyvinylpyrrolidone and the sulphosuccinate were each dissolved in hot water (100 ml.). The mannitol and polyvinylpyrrolidone solutions were mixed and diluted to 10 litres with water. The aspirin was sieved through a 40 mesh B.S.S. screen to remove hard aggregates (75% by weight of sieved material having a particle size less than 70 microns) and then mixed with the sulphosuccinate solution and 2 litres of the mannitol/polyvinylpyrrolidone solutions to form a smooth paste. The paste was then thoroughly mixed with the remainder of the mannitol solution and, whilst being continuously agitated, was pumped to a spray drier fitted with a central atomiser revolving at 24,000 r.p.m. The aspirin solution was atomised into a current of hot air passing through the drier, the inlet and outlet temperature of the air being 200°C. and 100°C. respectively. 98% by weight of the resultant dry, free-flowing coated aspirin particles passed through a 100 mesh B.S.S. screen, i.e., had a size less than 150 microns. Analysis of the sieved particles showed that approximately 99% by weight were less than 105 microns and approximately 93% by weight were less than 75 microns.

EXAMPLE 2

Free flowing coated aspirin particles were prepared by the same method as Example 1 but using the following ingredients:

| | |
|---|---|
| Aspirin | 3000 g. |
| Glycine | 3000 g. |
| Sodium carboxymethylcellulose | 25 g. |
| Polyoxyethylene sorbitan monolaurate | 5 g. |
| Distilled water | 12 litres |

The resultant particles had a size distribution similar to that obtained in Example 1.

EXAMPLE 3

Free flowing coated aspirin particles were prepared as follows:

| | |
|---|---|
| Aspirin | 4500 g. |
| Inositol | 500 g. |
| Gum acacia | 50 g. |
| Sodium lauryl sulphate | 15 g. |
| Distilled water | q.s. |

The inositol, gum acacia and sodium lauryl sulphate were dissolved in water (5 litres). The aspirin (particle size 10 to 150 microns) was added to the resultant solution with vigorous stirring and the solution was diluted with water to 10 litres. With continuous agitation, the aspirin suspension was pumped to the atomiser wheel (revolving at 30,000 r.p.m.) of a spray-drier. The inlet and outlet temperatures of the spray-drier were 230°C. and 120°C. respectively. After initial screening of the coating particles through a 100 mesh B.S.S. screen, it was found that 98% by weight of the particles were less than 90 microns.

EXAMPLE 4

Aspirin particles were prepared as in Example 1 except that the mannitol was replaced by sorbitol (700 g.) and lactose (300 g.)

EXAMPLE 5

Effervescent tablets were made to the following formula by conventional methods:

| | mg./tablet |
|---|---|
| *Aspirin particles (from Example 1) | 400 mg. |
| Citric acid | 450 mg. |
| Sodium bicarbonate | 495 mg. |
| Sodium saccharin | 2 mg. |
| Total | 1347 mg. |

*The aspirin particles from Example 1 were analysed and found to contain 300 mg. of aspirin in a total weight of particles of just under 400 mg. For convenience the weight was brought up to 400 mg. by addition of mannitol. The increased percentage of aspirin in the coated particles over that which could theoretically be present can be accounted for by a slight loss of coating agent due to adherance to the walls of the spray-drier.

The dissolution time in water of the effervescent aspirin tablets of this Example was between 60 and 90 sec., that is to say the same as conventional effervescent tablets containing 300 mg. of aspirin. The latter tablets however normally weigh at least 3 g. and accordingly are much larger than the tablets of this Example. Significant savings in packaging costs and, even allowing for the cost of preparing the aspirin particles, in raw-material costs can therefore be achieved using the aspirin particles of the present invention. Furthermore, since the daily dosage of effervescent aspirin tablets is normally restricted so that the sodium ion intake will not exceed about 200 mille equivalents (10 conventional tablets containing a total of 3.0 g. aspirin), an increased daily dosage of aspirin can be obtained with the tablets of this Example since the sodium ion content is just over 8 mille equivalents. That is to say up to 24 tablets containing 7.2 g. of aspirin may be administered daily, a significant increase in dosage over that hitherto obtainable with conventional effervescent aspirin tablets.

EXAMPLE 6

Effervescent tablets were made to the following formula by conventional methods:

| | | mg./tablet |
|---|---|---|
| 1) | Aspirin particles (from Example 2) | 600 mg. |
| 2) | Malic acid (coated) | 500 mg. |
| 3) | Sodium bicarbonate | 510 mg. |
| 4) | Sodium carbonate (treated) | 35 mg. |
| 5) | Sodium saccharin | 5 mg. |
| | Total | 1650 mg. |

Ingredient (1) was obtained by taking a weight of aspirin particles shown by analysis to contain 300 mg. aspirin and making up to 600 mg. by addition of glycine.

Ingredient (2) was obtained by mixing 10 kilos of malic acid in a semi-dissolved state with a sodium malate composition in water obtained from 8 kilos of malic acid and 2 kilos of sodium hydroxide. Mixing was continued for 5 minutes and the mixture was dried to give malic acid finely coated with sodium malate.

Ingredient (4) was obtained by heating anhydrous sodium carbonate at 170°C. for 3 hours under vaccuum.

In the foregoing Examples 5 and 6, the coated aspirin particles of the present invention constitute the sole therapeutic ingredient. However, the aspirin particles of this invention can be used in whole or part replacement of untreated aspirin in other types of aspirin formulations, including formulations containing therapeutic ingredients additional to aspirin, such as codeine, caffeine, phenacetin, paracetamol, phenylephrine, chloropheniramine, amphetamine, dexamphetamine, allobarbitone, amylobarbitone, butobarbitone, phenobarbitone, meprobamate, phenolphthalein, methocarbamol, vitamin C, vitamin K and dihydrocodeine.

We claim:

1. An effervescent composition comprising one part of free flowing readily wetable coated aspirin particles, of which at least 95 percent by weight are not more than 150 microns, comprising: one part of aspirin to one to one ninth part of a coating agent comprising at least one ingredient selected from glycine, methionine, sucrose, lactose, arabino galactan sugar products, manitol, inositol, and sorbitol; said coating agent also comprising up to 5 percent by weight of a wetting agent; and up to 10 percent by weight of a film forming agent selected from hydroxyethyl cellulose, hydroxy propyl methyl cellulose, sodium carboxymethyl cellulose, starches, dextrin, dextran, gun acacia, gum tragicanth and polyvinyl pyrrolidone: and three to six parts of an effervescent couple constituted by a mixture of a pharmaceutically acceptable acid and alkalai which in contact with water will react to liberate carbon dioxide, the ratio be weight of the aspirin to the total weight of the composition being greater than 1:8.

2. A composition according to claim 1 in which the coating material includes mannitol.

3. A composition according to claim 1 in which the coating material includes glycine.

4. A composition according to claim 1 in which the aspirin particles have the following properties:
   i. the melting point of the coating material being above 150°C
   ii. the ratio by weight of aspirin to coating material being from about 7:1 to about 1:1
   iii. at least 95% by weight of the particles being not greater in size than 105 microns.

5. Effervescent compositions, as claimed in claim 1, in tablet form.

* * * * *